(No Model.)
C. H. CRAWFORD.
CARPET FASTENER.
No. 587,935. Patented Aug. 10, 1897.
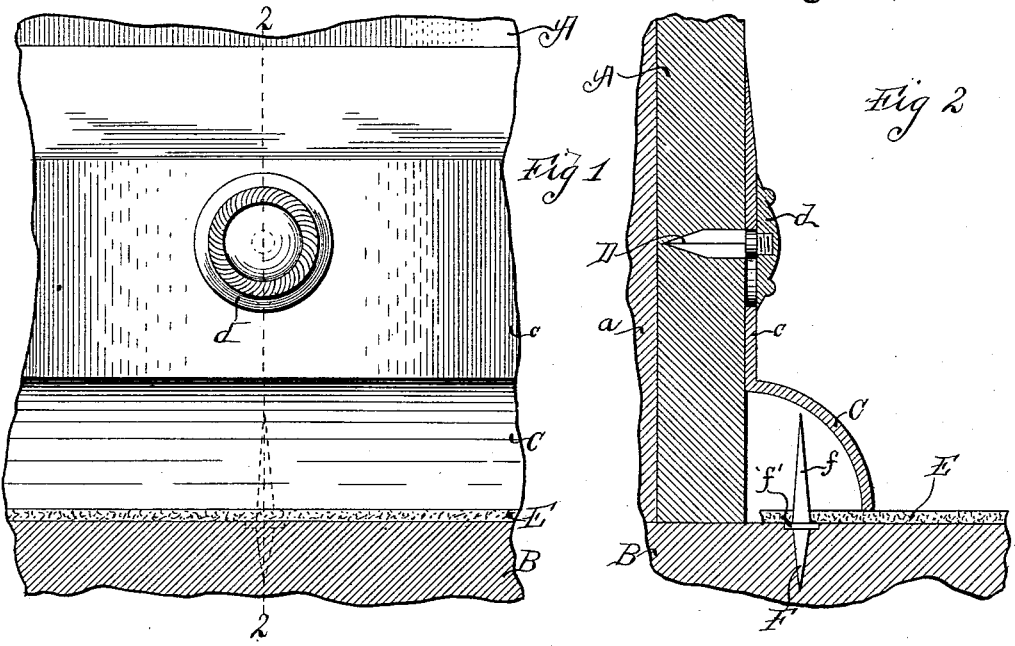
Witnesses
Louis K. Gillson
W. C. Coles
Inventor
Carl H. Crawford

UNITED STATES PATENT OFFICE.

CARL H. CRAWFORD, OF CHICAGO, ILLINOIS.

CARPET-FASTENER.

SPECIFICATION forming part of Letters Patent No. 587,935, dated August 10, 1897.

Application filed June 1, 1896. Serial No. 593,716. (No model.)

*To all whom it may concern:*

Be it known that I, CARL H. CRAWFORD, a citizen of the United States, residing at Chicago, in the county of Cook and State of Illinois, have invented certain new and useful Improvements in Fastenings for Carpets and Coverings Therefor; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has for its object the provision of means for more conveniently and neatly securing carpets to floors of dwellings and the like.

It consists of a tack having an upwardly-projecting pointed member over which the carpet may be caught, the tack being first driven into the floor, and a vertically-adjustable molding adapted to be secured to the mop-board for covering the upwardly-projecting points of the tacks and preventing the disengagement of the carpet therefrom, and in various details of construction, as are hereinafter described.

In the drawings, Figure is an elevation of a section of the hollow molding and mop-board. Fig. 2 is a vertical sectional view on the line 2 2 of Fig. 1. Fig. 3 is a vertical transverse section of the mop-board and tack-covering, showing a modification of each; and Fig. 4 is an elevation of a modified form of the tack and shows in longitudinal section the tool used in setting it.

An ordinary mop-board is shown at A as being in use in connection with a wall $a$ and a floor B. The carpet E is stretched upon the floor in the usual manner, but instead of being secured by means of the ordinary carpet-tack driven through it, the attachment is by means of a double-pointed tack consisting of the two oppositely-directed prongs or points F $f$ and an annular flange or head $f'$ uniting them. The prong F of the tack is forced into the floor until the flange $f'$ is in contact therewith, and the carpet is caught over the upwardly-projecting point $f$. When the carpet has been thus secured, the tacks are covered by the hollow ninety-degree or "quarter-round" molding C, which is preferably of metal and which, resting upon the carpet, extends to the mop-board and has an upwardly-projecting plate $c$, adapted to lie against the surface of the latter, to which it is held by suitable screws or nails. As this molding must be removed and replaced each time the carpet is taken up and relaid, it is important that the means for attaching it to the mop-board be such as may be easily released and resecured. I show a convenient form of attaching device consisting of a pointed body portion or nail D, having its outer end screw-threaded to receive a cap $d$, having a central aperture screw-threaded to take upon the end of the nail. This cap preferably has an annular milled or knurled rib, to which the thumb and fingers may be applied in placing or removing it.

As carpets vary in thickness and are sometimes turned under at one or more edges, provision is made for correspondingly vertically adjusting the molding without disturbing the nail D, which may have been placed in the mop-board in connection with a carpet of different thickness than the one about to be laid. This consists in making the aperture in the plate $c$ to receive the nail D as a vertically-elongated slot. The cap $d$ is of sufficient diameter to entirely cover this slot, even when the nail D is at its extreme end, as shown in Fig. 2.

In the construction of new houses it will be found cheaper to adapt the mop-board to the purposes of this invention. This is done by making the mop-board A' vertically narrower and locating its lower edge somewhat above the floor, so as to form a recess within which the tacks may be set. For the quarter-round form of molding C a flat plate C' is used which lies in the same plane as the attaching-plate $c$.

If desired, the heads or flanges $f'$ of the tacks may be countersunk into the floor, as shown in Fig. 5.

The advantages of this means of securing a carpet are several. The carpet is much more easily laid. The tacks are first secured in the floor along one or more sides of the room and the carpet caught over their upturned points as it is adjusted to its place. When the work is completed, there is a finished appearance to the room impossible to secure when the margin of the carpet is exposed to view and lies necessarily somewhat removed from the mop-board, leaving an opening within which dust and dirt will accumulate, providing a germinating-place for vermin. The carpet is easily taken up by either removing or loosening the hollow molding.

This carpet-fastening may either form a permanent fixture to the house or the tenant may provide it and remove it from house to house. The hollow molding and its face-plate may be ornamented as may be desired and may be made to present a neat and attractive appearance. It may be secured to the mop-board in a variety of ways. I have shown a form which is at once convenient, cheap, and neat, but do not wish to be limited to this form of construction, as any hollow molding for covering the edges of a carpet, whether the latter be secured by the improved form of tack herein described and shown or by the ordinary tack or other fastening, will come within the scope of my invention.

If desired, the flange $f'$ may be omitted from the tack, as shown in Fig. 8, the latter being set into the floor by means of a tool $o$, having an aperture adapted to receive the upper prong and bear upon its inclined surfaces.

I claim as my invention—

1. The combination, in a carpet-fastener, of a double-pointed tack adapted to enter a floor and to receive a carpet upon its upper end, of a molding adapted to fit against a mop-board and being vertically slotted for adjustable attachment thereto, and being adapted to bear upon the carpet to prevent its disengagement from the tack.

2. The combination in a carpet-fastener of a straight tack pointed at both ends and adapted to enter a floor and to receive a carpet upon its upper end, of a concave molding having an upwardly-projecting vertically-slotted plate, a pin adapted to be set permanently in a mop-board and to project outwardly through the slot in the plate and having its outer end screw-threaded, and a screw-cap adapted to the pin and to bind against the plate.

In testimony whereof I affix my signature in presence of two witnesses.

CARL H. CRAWFORD.

Witnesses:
SAKE D. THOMPSON,
LOUIS K. GILLSON.